UNITED STATES PATENT OFFICE.

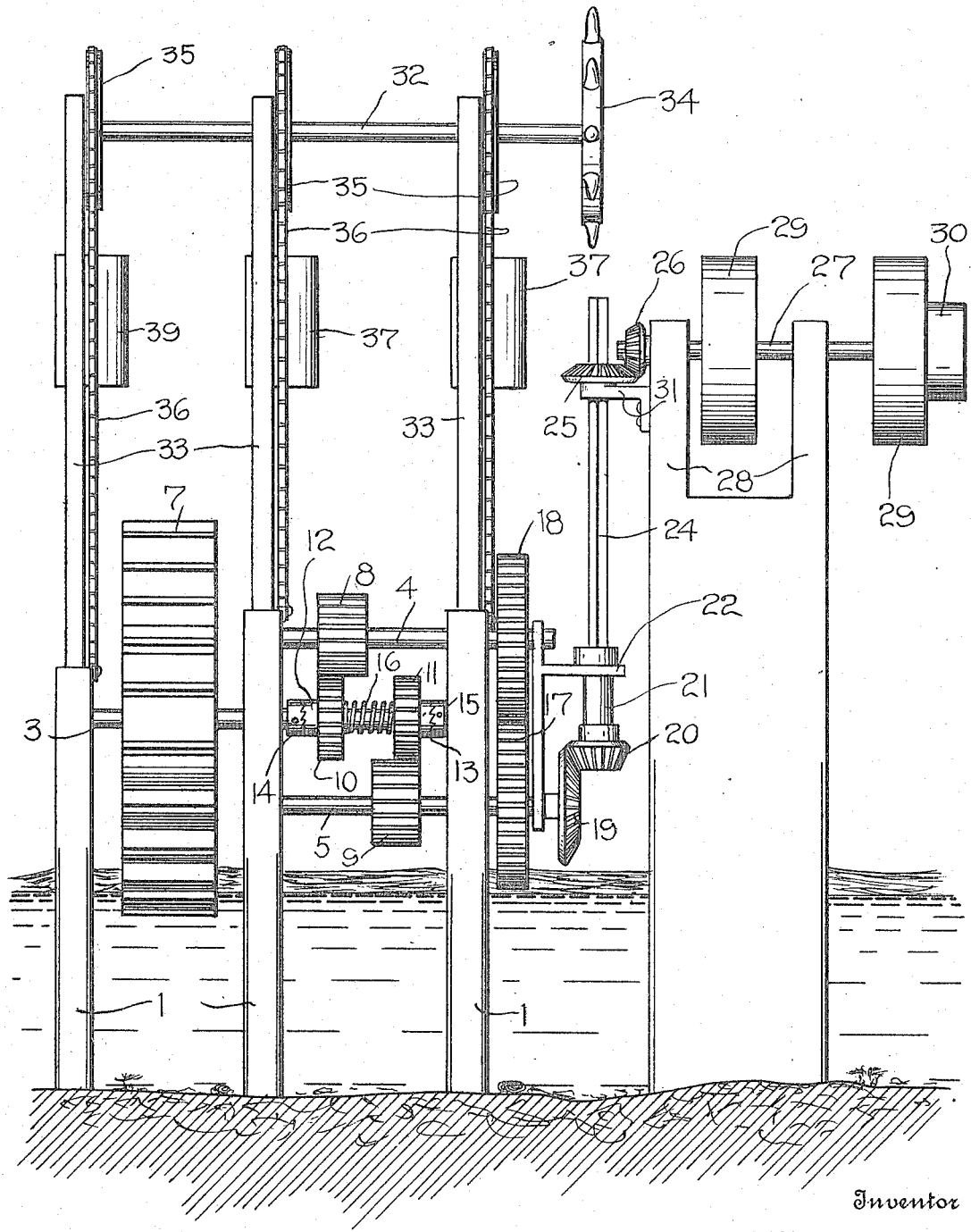

ACHILLES B. TOGNINI, OF CAYUCOS, CALIFORNIA.

TRANSMISSION-GEARING.

1,127,945.  Specification of Letters Patent.  Patented Feb. 9, 1915.

Application filed May 7, 1913. Serial No. 766,154.

*To all whom it may concern:*

Be it known that I, ACHILLES B. TOGNINI, a citizen of the United States, residing at Cayucos, in the county of San Luis Obispo and State of California, have invented certain new and useful Improvements in Transmission-Gearing, of which the following is a specification, reference being had to the accompanying drawings.

This invention comprehends certain new and useful improvements in wave motors and has for its primary object to provide a wave motor which will be of such construction that it will be readily and positively operated by the waves as they advance in and recede.

Another object is to provide a device of this character, the operative parts of which may be mounted in such manner as to be readily raised and lowered as the tide rises and falls to retain the paddle wheel in proper position according to the depth of the water.

A further object is to provide a wave motor which will be of comparatively simple construction and highly efficient and effective in operation.

A further object is to generally improve and simplify the construction and operation of devices of this character and increase the efficiency and durability of the same.

With the above and other objects in view, my invention consists in certain novel constructions, combinations and arrangements of parts to be hereinafter more fully described, claimed and illustrated in the accompanying drawing, in which, the figure is a side elevation of my complete motor.

Referring to the drawing, the numeral 1 designates the supporting piers or standards having guideways (not shown) in their upper ends, in which are mounted the bearings for the rotary and vertically movable horizontal shafts 3, 4, and 5. Upon the shaft 3, between two of the supporting walls, is mounted the paddle wheel 7 which constitutes a power transmitter and is adapted to be operated by the water in either direction, and thereby rotate the shaft 3 in one direction and then the other to drive the shaft 5 steadily in one direction only, through mechanism which will be later clearly and fully described.

It will be understood that the shafts 4 and 5 and the portion of the shaft 3 therebetween are parallel and in substantially the same vertical plane, the purpose of which will presently appear. The shaft 4, has the wide gear 8 mounted thereon while a similar gear wheel 9 is mounted upon the shaft 5 and offset from the gear 8. Upon the portion of the shaft 3 between the shafts 4 and 5 are loosely mounted spaced relatively narrow gear wheels 19 and 11, having the clutch members 12 and 13, respectively formed upon their outer faces and resiliently retained in engagement with the spaced clutch members 14 and 15 rigid with the shaft 3 by a coiled spring 16 encircling the shaft 3, and bearing at its ends against the opposed faces of the gears 10 and 11.

The gear 10 is continually in engagement with the wide gear 8 upon the shaft while the gear 11 is continually in engagement with the wide gear 9 upon the shaft 5. It will be understood that the teeth of the clutch member 14 extend in one direction while the teeth upon the clutch member 15 extend in the reverse direction and that the teeth of the clutch members 12 and 13 are formed for engagement with the teeth of the opposed clutch members 14 and 15, whereby when the shaft 3 is rotated in one direction, the clutch member 14 will turn the clutch member 12 and gear 10, thereby rotating the shaft 4 in one direction while a reverse rotation of the shaft 3 will cause the clutch member 15 to drive the clutch member 13 and gear wheel 11, thereby rotating the gear 9 and shaft 5 in the opposite direction. As the shaft 5 has a large gear wheel 17 mounted thereon which is continually in mesh with the large gear wheel 18 upon the shaft 4, the shaft 5 will be rotated in the same direction when the clutch member 14 drives the clutch member 12, as when the clutch member 15 drives the clutch member 13. It will therefore be seen that the shaft 5 is always rotated in the same direction.

One end of the shaft 5 is extended beyond the gear 17 and has the bevel gear 19 mounted thereon which is engaged by the bevel pinion 20 formed upon one end of the stub shaft 21 which is rotatably mounted in a bracket member 22, mounted on the projecting ends of the shafts 4 and 5, and having a squared opening (not shown) formed in its upper end in which is secured the lower end of a square shaft 24, the upper end of which is slidably engaged through a bevel gear 25 which meshes with a bevel pinion 26 mounted upon one end of the power shaft 27 which latter is rotatably mounted in the supports 28 and carries the fly wheels 29 and belt wheel 30. The bevel gear 25 rests upon a stationary support 31 positioned around the upper end of the squared shaft 24, thereby preventing the bevel gear 25 from moving downwardly, it being understood that upward movement of the same is prevented by the bevel pinion 26.

A shaft 32 is positioned above the shafts 3, 4 and 5 and is journaled in suitable bearings arranged at the upper ends of uprights 33 extended upwardly from the standards 1. This shaft has a hand wheel 34 mounted thereon by means of which it may be readily rotated for raising and lowering the shafts 3, 4 and 5 as will presently be clearly understood. Mounted upon the shaft 32 are the sprocket wheels 35 over which are engaged the chains 36, each of which has one end secured to one of the bearings of the shafts 3, 4 and 5 while the weights 37 are secured upon the opposite or free ends of the chains to counterbalance the weight of the shafts 3, 4 and 5 and the parts carried thereby and connected therewith, whereby rotation of the shaft 32 in one direction will raise the shafts 3, 4 and 5 and the parts carried by the same and the vertical squared shaft 24, while rotation of the shaft 32 in the opposite direction will allow these vertically movable parts to move downwardly. It will therefore be seen that the height of the paddle wheel 7 and the parts connected therewith may be readily varied as desired, for high tide or low tide in order that the paddle wheel 7 may be properly operated by the waves.

It will be understood that the height of the shafts 3, 4 and 5 may be readily varied by any suitable means other than by means of turning the shaft 32 by the hand wheel 34, if desired. For example, floats or buoys may be employed, or the vertically movable parts may be raised by hydraulic pressure.

What I claim is:—

1. An apparatus of the class described comprising a driving shaft carrying spaced rigid clutch members having their teeth pitched in opposite directions, gears loosely mounted on the shaft and carrying clutch members, a spring on the shaft operating to hold the two sets of clutch members in yielding engagement, a pair of driven shafts, one of which constitutes a power transmission shaft, gears carried by the driven shafts, each meshing with one of those on the driving shaft independently of the other, and intermeshing gears carried by the drive shafts, whereby the direction of rotation of the power transmission shaft will always be in the same direction.

2. An apparatus of the class described comprising a driving shaft carrying spaced rigid clutch members having their teeth pitched in opposite directions, gears loosely mounted on the shaft and carrying clutch members, a spring on the shaft operating to hold the two sets of clutch members in yielding engagement, a pair of driven shafts, one of which constitutes a power transmission shaft, gears carried by the driven shafts, each having a sliding intermesh with one of those on the drive shaft independently of the other, and intermeshing gears carried by the driven shafts.

In testimony whereof I hereunto affix my signature in the presence of two witnesses.

ACHILLES B. TOGNINI.

Witnesses:
VALENTE TOGNAZZINI,
E. GENARDINI.